US006888322B2

(12) United States Patent
Dowling et al.

(10) Patent No.: US 6,888,322 B2
(45) Date of Patent: May 3, 2005

(54) SYSTEMS AND METHODS FOR COLOR CHANGING DEVICE AND ENCLOSURE

(75) Inventors: Kevin J. Dowling, Westford, MA (US); George G. Mueller, Boston, MA (US); Ihor A. Lys, Boston, MA (US)

(73) Assignee: Color Kinetics Incorporated, Boston, MA (US)

(*) Notice: Subject to any disclaimer, the term of this patent is extended or adjusted under 35 U.S.C. 154(b) by 66 days.

(21) Appl. No.: 09/917,246

(22) Filed: Jul. 27, 2001

(65) Prior Publication Data

US 2002/0047569 A1 Apr. 25, 2002

Related U.S. Application Data

(63) Continuation-in-part of application No. 09/815,418, filed on Mar. 22, 2001, now Pat. No. 6,577,080, and a continuation-in-part of application No. 09/742,017, filed on Dec. 20, 2000, now abandoned, and a continuation-in-part of application No. 09/669,121, filed on Sep. 25, 2000, and a continuation-in-part of application No. 09/626,905, filed on Jul. 27, 2000, now Pat. No. 6,340,868, which is a continuation of application No. 09/425,770, filed on Oct. 22, 1999, now Pat. No. 6,150,774, and a continuation-in-part of application No. 09/333,739, filed on Jun. 15, 1999, which is a continuation-in-part of application No. 09/215,624, filed on Dec. 17, 1998, now Pat. No. 6,528,954, and a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, and a continuation-in-part of application No. 09/213,540, filed on Dec. 17, 1998, now Pat. No. 6,720,745, which is a continuation of application No. 09/213,548, filed on Dec. 17, 1998, now Pat. No. 6,166,496, which is a continuation of application No. 09/213,659, filed on Dec. 17, 1998, now Pat. No. 6,211,626, which is a continuation of application No. 08/920,156, filed on Aug. 26, 1997, now Pat. No. 6,016,038.

(60) Provisional application No. 60/221,579, filed on Jul. 28, 2000, provisional application No. 60/090,920, filed on Jun. 26, 1998, provisional application No. 60/079,285, filed on Aug. 25, 1998, provisional application No. 60/078,861, filed on Mar. 20, 1998, provisional application No. 60/068,792, filed on Dec. 24, 1997, and provisional application No. 60/071,281, filed on Dec. 17, 1997.

(51) Int. Cl.[7] .............................................. G05F 1/00
(52) U.S. Cl. ....................... 315/292; 315/312; 315/362; 340/815.65; 340/815.45; 340/814.49; 362/800
(58) Field of Search .............................. 315/169.3, 291, 315/362, 312, 292, 300, 307, 308, 297; 362/800, 227; 340/815.45, 815.49, 815.56, 815.65, 815.66

(56) References Cited

U.S. PATENT DOCUMENTS

| | | |
|---|---|---|
| 3,561,719 A | 2/1971 | Grindle |
| 3,643,088 A | 2/1972 | Osteen et al. |

(Continued)

FOREIGN PATENT DOCUMENTS

| | | |
|---|---|---|
| AU | 6267 9 | 12/1996 |

(Continued)

OTHER PUBLICATIONS

"LM117/LM317A/LM317 3–Terminal Adjustable Regulator", National Semiconductor Corporation, May 1997, pp. 1–20.

(Continued)

Primary Examiner—Haissa Philogene
(74) Attorney, Agent, or Firm—Lowrie, Lando & Anastasi, LLP

(57) ABSTRACT

A color-changing device which includes an enclosure at least a portion of which is material which is desired to change color. There is also included an illumination device, such as an LED or collection of LEDs which can illuminate the material. There can also be included a controller which can take some form of input, such as from a network, or a sensor, and can convert that input into a signal to control the illumination. There is also included a method for performing such color change.

96 Claims, 4 Drawing Sheets

U.S. PATENT DOCUMENTS

| | | |
|---|---|---|
| 3,746,918 A | 7/1973 | Drucker et al. |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 4,001,571 A | 1/1977 | Martin |
| 4,054,814 A | 10/1977 | Fegley et al. |
| 4,082,395 A | 4/1978 | Donato et al. |
| 4,096,349 A | 6/1978 | Donato |
| 4,241,295 A | 12/1980 | Williams, Jr. |
| 4,272,689 A | 6/1981 | Crosby et al. |
| 4,273,999 A | 6/1981 | Pierpoint |
| 4,277,665 A | 7/1981 | Kondo et al. |
| 4,298,869 A | 11/1981 | Okuno |
| 4,329,625 A | 5/1982 | Nishizawa et al. |
| 4,342,906 A * | 8/1982 | Hyatt ................. 250/205 |
| 4,367,464 A | 1/1983 | Kurahashi et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,420,711 A | 12/1983 | Takahashi et al. |
| 4,500,796 A | 2/1985 | Quin |
| 4,625,152 A | 11/1986 | Nakai |
| 4,647,217 A | 3/1987 | Havel |
| 4,656,398 A | 4/1987 | Michael et al. |
| 4,668,895 A | 5/1987 | Schneiter |
| 4,675,575 A * | 6/1987 | Smith et al. ............. 315/185 S |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,701,669 A | 10/1987 | Head et al. |
| 4,705,406 A | 11/1987 | Havel |
| 4,707,141 A | 11/1987 | Havel |
| 4,727,289 A | 2/1988 | Uchida |
| 4,740,882 A | 4/1988 | Miller |
| 4,771,274 A | 9/1988 | Havel |
| 4,780,621 A | 10/1988 | Bartleucci et al. |
| 4,818,072 A | 4/1989 | Mohebban |
| 4,837,565 A | 6/1989 | White |
| 4,845,481 A | 7/1989 | Havel |
| 4,845,745 A | 7/1989 | Havel |
| 4,863,223 A | 9/1989 | Weissenbach et al. |
| 4,874,320 A | 10/1989 | Freed et al. |
| 4,887,074 A | 12/1989 | Simon et al. |
| 4,922,154 A | 5/1990 | Cacoub |
| 4,934,852 A | 6/1990 | Havel |
| 4,965,561 A | 10/1990 | Havel |
| 4,973,835 A | 11/1990 | Kurosu et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,027,262 A | 6/1991 | Freed |
| 5,034,807 A | 7/1991 | Von Kohorn |
| 5,083,063 A | 1/1992 | Brooks |
| 5,126,634 A | 6/1992 | Johnson |
| 5,128,595 A | 7/1992 | Hara |
| 5,134,387 A | 7/1992 | Smith et al. |
| 5,142,199 A | 8/1992 | Elwell |
| 5,154,641 A | 10/1992 | McLaughlin |
| 5,164,715 A | 11/1992 | Kashiwabara et al. |
| 5,184,114 A | 2/1993 | Brown |
| 5,194,854 A | 3/1993 | Havel |
| 5,209,560 A | 5/1993 | Taylor et al. |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,282,121 A | 1/1994 | Bornhorst et al. |
| 5,294,865 A | 3/1994 | Haraden |
| 5,305,013 A | 4/1994 | Daniels |
| D348,905 S | 7/1994 | Smid |
| 5,329,431 A | 7/1994 | Taylor et al. |
| 5,339,213 A | 8/1994 | O'Callaghan |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,387,901 A | 2/1995 | Hardt |
| 5,388,357 A | 2/1995 | Malita |
| 5,398,041 A * | 3/1995 | Hyatt ........................ 345/88 |
| 5,404,282 A | 4/1995 | Klinke et al. |
| 5,406,176 A | 4/1995 | Sugden |
| 5,406,729 A | 4/1995 | Bejin |
| 5,410,328 A | 4/1995 | Yoksza et al. |
| 5,412,284 A | 5/1995 | Moore et al. |
| 5,420,482 A | 5/1995 | Phares |
| 5,422,751 A | 6/1995 | Lewis et al. |
| 5,424,754 A * | 6/1995 | Bar et al. ................... 345/549 |
| 5,432,408 A | 7/1995 | Matsuda et al. |
| 5,436,535 A | 7/1995 | Yang |
| 5,463,280 A | 10/1995 | Johnson |
| 5,465,144 A | 11/1995 | Parker et al. |
| 5,489,827 A | 2/1996 | Xia |
| 5,491,402 A | 2/1996 | Small |
| 5,504,395 A | 4/1996 | Johnson et al. |
| 5,515,244 A | 5/1996 | Levins et al. |
| 5,545,950 A | 8/1996 | Cho |
| 5,561,346 A | 10/1996 | Byrne |
| 5,575,459 A | 11/1996 | Anderson |
| 5,575,554 A | 11/1996 | Guritz |
| 5,592,051 A | 1/1997 | Korkala |
| 5,615,945 A | 4/1997 | Tseng |
| 5,634,080 A * | 5/1997 | Kikinis et al. ............... 345/156 |
| 5,640,061 A | 6/1997 | Bornhorst et al. |
| 5,689,400 A | 11/1997 | Ohgami et al. |
| 5,701,058 A | 12/1997 | Roth |
| 5,721,471 A | 2/1998 | Begemann et al. |
| 5,742,120 A | 4/1998 | Lin |
| 5,751,118 A | 5/1998 | Mortimer |
| 5,752,766 A | 5/1998 | Bailey et al. |
| 5,769,527 A | 6/1998 | Taylor et al. |
| 5,803,579 A | 9/1998 | Turnbull et al. |
| 5,808,689 A | 9/1998 | Small |
| 5,821,695 A | 10/1998 | Vilanilam et al. |
| 5,852,658 A | 12/1998 | Knight et al. |
| RE36,030 E | 1/1999 | Nadeau |
| 5,859,508 A | 1/1999 | Ge et al. |
| 5,896,010 A | 4/1999 | Mikolajczak et al. |
| 5,912,653 A | 6/1999 | Fitch |
| 5,914,709 A | 6/1999 | Graham et al. |
| 5,924,784 A | 7/1999 | Chliwnyj et al. |
| 5,946,209 A | 8/1999 | Eckel et al. |
| 5,952,680 A | 9/1999 | Strite |
| 5,959,547 A | 9/1999 | Tubel et al. |
| 5,963,185 A | 10/1999 | Havel |
| 5,974,553 A | 10/1999 | Gandar |
| 5,988,645 A * | 11/1999 | Downing ................. 250/222.2 |
| 6,016,038 A | 1/2000 | Mueller et al. |
| 6,018,237 A | 1/2000 | Havel |
| 6,030,088 A | 2/2000 | Scheinberg |
| 6,058,634 A | 5/2000 | McSpiritt |
| 6,072,280 A | 6/2000 | Allen |
| 6,089,893 A | 7/2000 | Yu et al. |
| 6,109,760 A | 8/2000 | Salatrik et al. |
| 6,132,072 A | 10/2000 | Turnbull et al. |

| | | | |
|---|---|---|---|
| 6,135,604 A | 10/2000 | Lin | |
| 6,150,774 A | 11/2000 | Mueller et al. | |
| 6,161,944 A | 12/2000 | Leman | |
| 6,166,496 A | 12/2000 | Lys et al. | |
| 6,183,086 B1 | 2/2001 | Neubert | |
| 6,184,628 B1 | 2/2001 | Ruthenberg | |
| 6,190,017 B1 | 2/2001 | Lai | |
| 6,196,471 B1 | 3/2001 | Ruthenberg | |
| 6,211,626 B1 | 4/2001 | Lys et al. | |
| 6,215,409 B1 | 4/2001 | Blach | |
| 6,217,182 B1 | 4/2001 | Shepherd et al. | |
| 6,224,244 B1 | 5/2001 | Burys | |
| 6,250,774 B1 | 6/2001 | Begemann et al. | |
| 6,268,845 B1 * | 7/2001 | Pariza et al. | 345/581 |
| 6,285,420 B1 | 9/2001 | Mizumo et al. | |
| 6,292,901 B1 | 9/2001 | Lys et al. | |
| 6,340,868 B1 | 1/2002 | Lys et al. | |
| 6,357,887 B1 | 3/2002 | Novak | |
| 6,361,186 B1 | 3/2002 | Slayden | |
| 2001/0033488 A1 | 10/2001 | Chliwnyj et al. | |
| 2002/0190975 A1 | 12/2002 | Kerr | |

FOREIGN PATENT DOCUMENTS

| | | |
|---|---|---|
| CA | 2 178 432 | 12/1996 |
| EP | 0564127 A2 | 10/1993 |
| EP | 0534710 B1 | 1/1996 |
| EP | 0752632 A2 | 1/1997 |
| EP | 0752632 A3 | 8/1997 |
| EP | 1020352 A2 | 7/2000 |
| EP | 1113215 A2 | 7/2001 |
| FR | 88 17359 | 12/1998 |
| GB | 2176042 A | 12/1986 |
| JP | 06043830 | 2/1994 |
| JP | 8-106264 | 4/1996 |
| JP | 9 320766 | 12/1997 |
| JP | 2001 147739 | 5/2001 |
| WO | WO 89/05086 | 6/1989 |
| WO | WO 94/18809 | 8/1994 |
| WO | WO 95/13498 | 5/1995 |
| WO | WO 96/41098 | 12/1996 |
| WO | WO 00/28510 | 5/2000 |

OTHER PUBLICATIONS

"DS96177 RS–485 / RS–422 Differential Bus Repeater", National Semiconductor Corporation, Feb. 1996, pp. 1–8.

"DS2003 / DA9667 / DS2004 High Current / Voltage Darlington Drivers", National Semiconductor Corporation, Dec. 1995, pp. 1–8.

"LM140A / LM140 / LM340A / LM7800C Series 3—Terminal Positive Regulators", National Semiconductor Corporation, Jan. 1995, pp. 1–14.

High End Systems, Inc., Trackspot User Manual, Aug. 1997, Excerpts (Cover, Title page, pp. ii through iii and 2–13 through 2–14).

Artistic License, AL4000 DMX512 Processors, Revision 3.4, Jun. 2000, Excerpts (Cover, pp. 7,95 through 102).

Artistic License, Miscellaneous Drawings (3 sheets) Jan. 12, 1995.

Artistic License, Miscellaneous Documents (2 sheets Feb. 1995 and Apr. 1996).

Co–pending U.S. Appl. No. 09/213,581, filed Dec. 17, 1998, entitled "Kinetic Illumination Systems and Methods," our File No. C01104/70049.

Website www.colorkinetics.com/products/controllers/index.htm, "Controllers fee the power. it's Herculean", downloaded Apr. 17, 2001.

Website www.colorkinetics.com/products/light/icolor/index.htm, "iColor Series iWant.iNeed.iHave to have", downloaded Apr. 17, 2001.

Website til.info.apple.com/techinfo.nsf/artnum/n58417, Tech Info Library–1 Book: How to Determine Battery Charge Status, downloaded Jun. 3, 2001.

Website www.cksauce.com/products/lightwand.htm, "LightWand" downloaded Jan. 28, 2002.

Website www.cksauce.com/products/minilightwand.htm "MiniLightWand" downloaded Jan. 28, 2002.

Website www.cksauce.com/products/lightwasher.htm "Lightwasher" downloaded Jan. 28, 2002.

Website www.cksauce.com/products/lightorb.htm "LightOrb" downloaded Jan. 28, 2002.

Website www.cksauce.com/products/lightsprite.htm "LightSprite" downloaded Jan. 28, 2002.

Website www.cksauce/products/lightsaucer.htm "LightSaucer" downloaded Jan. 28, 2002.

Website www.itech.com/products/guest alert.htm "GuestAlert Guest Paging Systems" downloaded Jan. 28, 2002.

Website www.2.consumer.philips.com/global/b2c/ce/catalog/product.ihtml?divId=O&groupID=TVdownloaded Jan. 28, 2002.

Circuit City advertisement for Philips Somba 13 stero TV.

International Search Report for International Application No. PCT/US01/41438 (mailed Apr. 10, 2003).

* cited by examiner

SYSTEMS AND METHODS FOR COLOR CHANGING DEVICE AND ENCLOSURE

RELATED APPLICATIONS

This Patent Application claims the benefit under 35 U.S.C. §119(e) of U.S. Provisional Application Ser. No. 60/221,579, filed Jul. 28, 2000, entitled "Color Changing Device and Enclosure."

This application also claims the benefit under 35 U.S.C. §120 as a continuation-in-part (CIP) of co-pending U.S. Non-provisional Application Ser. No. 09/669,121, filed Sep. 25, 2000, entitled "Multicolored LED Lighting Method and Apparatus", which is a continuation of U.S. Ser. No. 09/425,770, filed Oct. 22, 1999, now U.S. Pat. No. 6,150,774, which is a continuation of U.S. Ser. No. 08/920,156, filed Aug. 26, 1997, now U.S. Pat. No. 6,016,038.

This application also claims the benefit under 35 U.S.C. §120 as a continuation-in-part (CIP) of the following U.S. Non-provisional Applications:

U.S. Ser. No. 09/215,624, filed Dec. 17, 1998, entitled "Smart Light Bulb", now U.S. Pat. No. 6,528,954, which claims the benefit of the following provisional applications:

Ser. No. 60/071,281, filed Dec. 17, 1997, entitled "Digitally Controlled Light Emitting Diodes Systems and Methods";

Ser. No. 60/068,792, filed Dec. 24, 1997, entitled "Multi-Color Intelligent Lighting";

Ser. No. 60/078,861, filed Mar. 20, 1998, entitled "Digital Lighting Systems";

Ser. No. 60/079,285, filed Mar. 25, 1998, entitled "System and Method for Controlled Illumination"; and Ser. No. 60/090,920, filed Jun. 26, 1998, entitled "Methods for Software Driven Generation of Multiple Simultaneous High Speed Pulse Width Modulated Signals";

Ser. No. 09/213,607, filed Dec. 17, 1998, entitled "Systems and Methods for Sensor-Responsive Illumination" now abandoned;

Ser. No. 09/213,189, filed Dec. 17, 1998, entitled "Precision Illumination", now U.S. Pat. No 6,459,919;

U.S. Ser. No. 09/213,581, filed Dec. 17, 1998, entitled "Kinetic Illumination";

U.S. Ser. No. 09/213,540, filed Dec. 17, 1998, entitled "Data Delivery Track" now U.S. Pat. No. 6,720,745;

U.S. Ser. No. 09/333,739, filed Jun. 15, 1999, entitled "Diffuse Illumination Systems and Methods";

U.S. Ser. No. 09/742,017, filed Dec. 20, 2000, entitled "Lighting Entertainment System" now abandoned, which is a continuation of U.S. Ser. No. 09/213,548, filed Dec. 17, 1998, now U.S. Pat. No. 6,166,496;

U.S. Ser. No. 09/815,418, filed Mar. 22, 2001, entitled "Lighting Entertainment System" now U.S. Pat. No. 6,557,080, which also is a continuation of U.S. Ser. No. 09/213,548, filed Dec. 17, 1998, now U.S. Pat. No. 6,166,496; and U.S. Ser. No. 09/626,905, filed Jul. 27, 2000, entitled "Lighting Components" now U.S. Pat. No. 6,340,868, which is a continuation of U.S. Ser. No. 09/213,659, filed Dec. 17, 1998, now U.S. Pat. No. 6,211,626.

BACKGROUND OF THE INVENTION

1. Field of the Invention

The invention relates to systems and methods for the design of devices and enclosures, in particular for the design of enclosures that can change color.

2. Description of Related Art

Computers have recently been introduced where the computer enclosure is a color other than the conventional beige. These computers are offered in a variety of colors. The enclosures are formed of a semi-transparent plastic of a particular color, such as blue, red or green. The enclosures are slightly translucent to allow the user to see the internal components of the computer. The use of brightly and interestingly colored enclosures for various different types of devices is becoming more and more popular. Cellular phones can now have covers or button sets produced in a variety of different colors that can be transparent or semi-transparent or can be decorated with figures or symbols. Personal Digital Assistants (PDAs) have also recently been introduced that have a transparent or semi-transparent enclosure in a variety of colors.

A problem with these enclosures is that they only come in a static color. Once you have bought a blue computer you keep a blue computer unless you want to purchase a new enclosure in a different static color. This is an upgrade that can be expensive and require significant time to install. In addition, the color cannot easily change in response to computer states or digital information. A single enclosure capable of color changing would be desirable to eliminate the static color requirements of the present enclosure.

SUMMARY OF THE INVENTION

One embodiment of the present invention is a color-changing device. The color changing device may include an enclosure; a piece of material which is to be illuminated which makes up at least a portion of said enclosure; and an illumination device for illuminating said material.

Another embodiment of the present invention is directed to a method for changing the color of a device. The method involves the acts of providing a device; illuminating at least a portion of said device; and changing the color of said illumination.

A further embodiment of the present invention is directed to a method for changing the color of a device. The method involves the acts of generating an input signal; generating a control signal in response to the input signal; communicating the control signal to a lighting system; and arranging the lighting system to illuminate at least a portion of the device enclosure.

DETAILED DESCRIPTION

Figure 1:
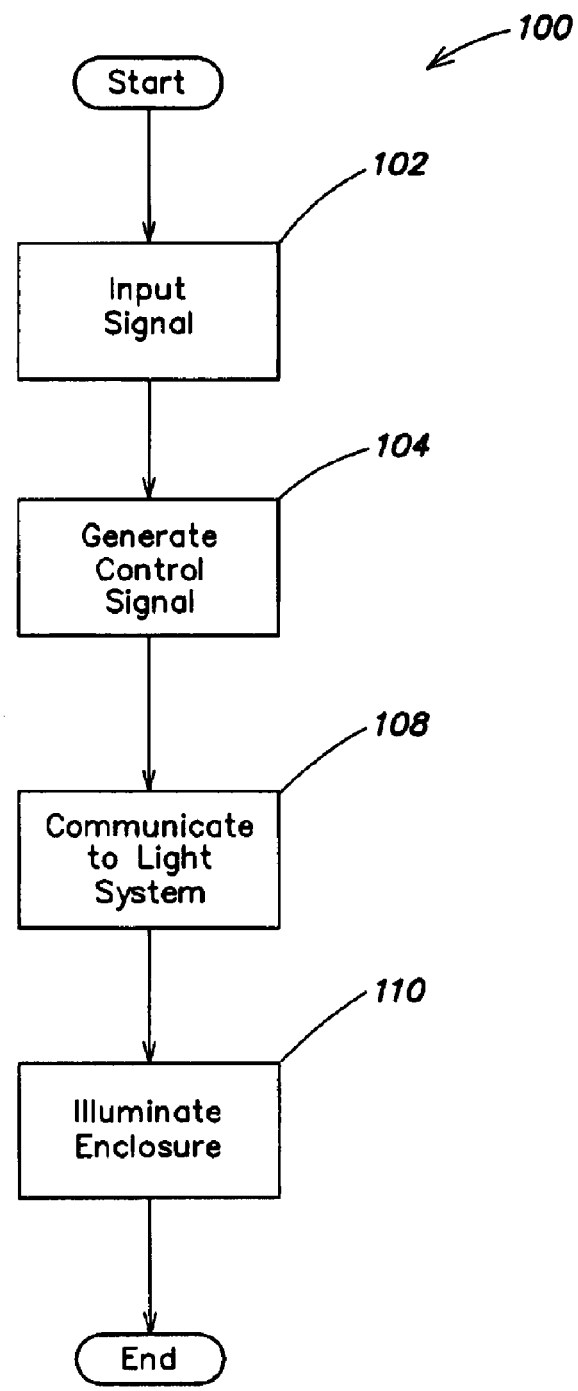
FIG. 1 is a flow diagram of a process according to one embodiment of the present invention.

In one embodiment of the invention an illumination system such as an LED system of one or more LEDs is arranged to edge light or backlight an enclosure to provide a colored enclosure or a color changing enclosure. One possible technology for implementing color changing illumination systems is described in U.S. Pat. No. 6,016,038, the disclosure of which is herein incorporated by reference. In addition, color changing illumination systems need not be LED based and in other embodiments of the invention the color changing illumination devices could comprise, but are not limited to, fiber optic strands, incandescent lighting, fluorescent lighting, or other solid-state technology such as Electro-luminescent (EL) or organic LED-based devices (OLED).

The enclosure could be an enclosure for any type of device such as, but not limited to; a desktop, laptop, server, hand-held, web-access, or any other type of computer, computer peripherals or accessories (such as, but not limited to, disk drive, mouse or other pointing device, printer, scanner, keyboard, cables, or modem) media players; DVD players and recorders; CD players and recorders; tape players and recorders; stereo receivers; self contained stereo systems; televisions; television remote controls or other peripherals; cable TV decoder boxes; projection systems; speakers and speaker systems; landline or wireless telephones; radio frequency (RF) transmission or communication devices; personal digital assistants (PDAs); toys; watches; appliances; refrigerators; stoves; ovens; dishwashers; trash compactors; hand held devices; or any other device or article with an enclosure.

The enclosure can be made of any transparent, semi-transparent, translucent or semi-translucent material, however, for ease of discussion, the material will be referred to as translucent to mean any of the above properties. The material can be entirely translucent or a portion of the material can be translucent. The LEDs can be arranged to edge light the enclosure such that a portion of the light couples to the enclosure edge and is transmitted through the material and/or a portion of the light is transmitted across the surface of the enclosure. Light traveling along the surface or through the material will be reflected off of or out of the material by imperfections in the material. These imperfections can be introduced deliberately or through inherent properties of the material. Making patterns of imperfections on or in the material can create surface lighting effects. The imperfections can also be applied to the entire surface to provide a glowing surface.

The LEDs can also be arranged to back light the enclosure or a surface behind the enclosure. Back lighting can achieve the same effects as edge lighting, or different effects could be achieved if a panel within the enclosure was backlit. The LEDs could be arranged to direct the emitted light at any direction at or near the enclosure to provide illumination of the enclosure. They could also be arranged to project patterns or symbols onto the enclosure. In one embodiment, the LEDs (or other lighting system) are disposed within the enclosure.

Figure 2:
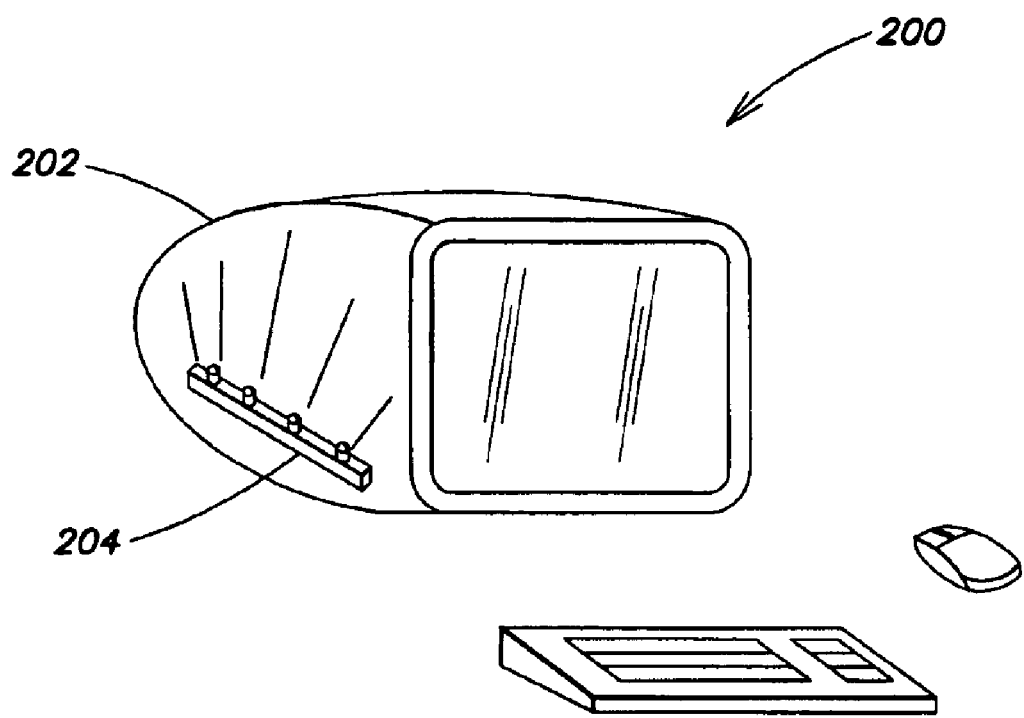
FIG. 2 illustrates a device with a lighted enclosure according to one embodiment of the present invention.

FIG. 2 illustrates a system according to the principles of the present invention. In this embodiment, the device 200 is a computer monitor with an enclosure 202. The system includes an illumination device 204 that is arranged to illuminate the enclosure or some portion thereof.

Figure 3:
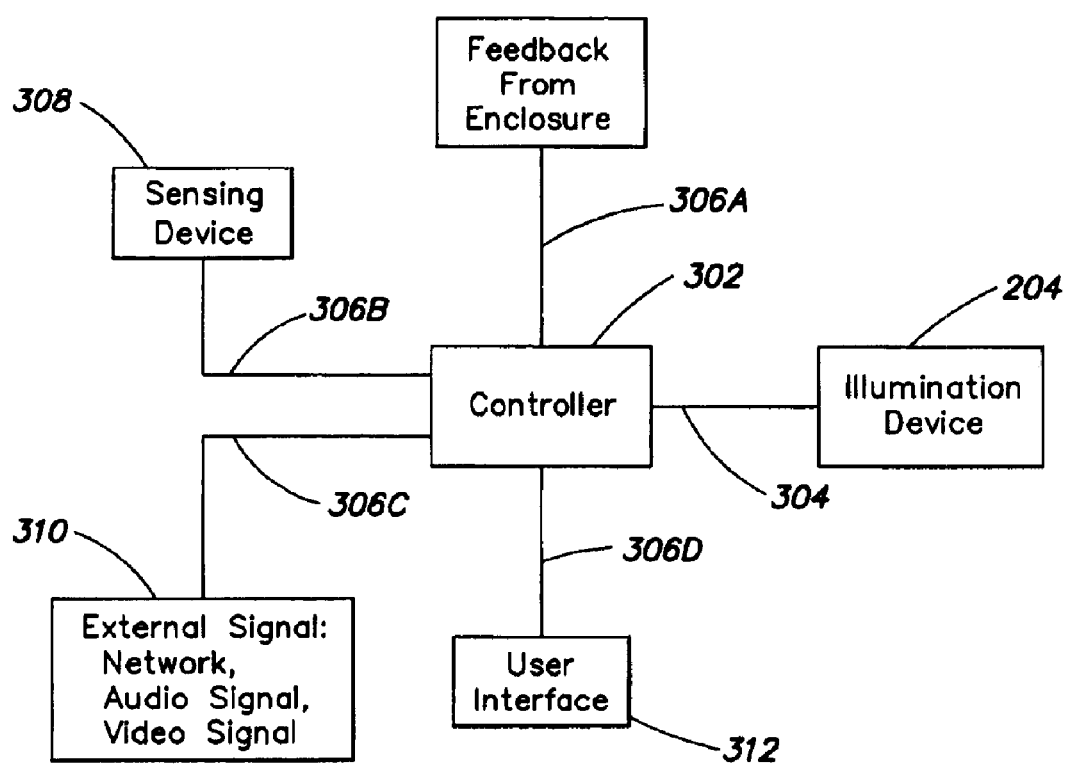
FIG. 3 illustrates various components of an illumination system according to one embodiment of the invention.

The illumination system can be controlled with a microprocessor or with passive circuitry. In an embodiment, the circuitry or microprocessor can provide a pulse width modulating signal or other control signals to drive the illumination system. Previously referenced U.S. Pat. No 6,016,038 provides one possible method for doing this. As shown in FIG. 3, the circuitry or microprocessor may include a controller 302 to provide one or more control signals 304 based at least in part on one or more input signals 306A, 306B, 306C, and 306D from the enclosed device or one or more other devices (e.g., a sensing device 308, one or more external signal sources 310 that generate network or Internet signals, audio signals and/or video signals, and a user interface 312). The controller could be any type of software process, hardware, or separate device that can receive input signals from a switch, transducer, processor, sensor, or receiver either directly as a digital signal or an analog signal through an analog/digital converter. If at least two different colored illumination devices are used in the illumination system, they can be controlled through separate control signals, separate sensors, or separate controllers to provide a variety of colors to the enclosure.

One embodiment of the invention would be to use the color changing or lighted enclosure as a computer enclosure or a portion of the computer enclosure. The color changing effects could be controlled through the controller to correlate or respond to signals generated within the enclosed computer, from a computer network, or from another device. The enclosure may also change color on demand through external switching or transducers or could be controlled internal to the computer by user controlled software or hardware. With the former arrangement, the computer could change colors as the result of the computer receiving email or other information, or could change colors with regard to system activity, for instance a busy computer could be red while a ready computer was green. The enclosure could also change colors as a result of changing variables from a network. In one embodiment, it could change colors based on information received from the World Wide Web. For example, if stock prices fall according to a particular website or websites, the enclosure could turn red and if they go up the enclosure could change to blue. The system could also be used in conjunction with e-business or Internet advertising allowing an individual having a site or advertisement on the Internet to transmit colors they desired the enclosure to be. For example, Coca-Cola could turn a user's enclosure red (or even Coca Cola's specific shade of red) when the user views pages posted by Coca-Cola or when ads for Coca-Cola are presented to the user. Alternatively, the colors chosen could simply be determined to encourage the users purchase of certain types of products. For instance, red and yellow could be presented with food ads or pages as these colors are believed to promote purchases of food items.

In a still further embodiment, the system could be linked with an external sensing device to determine color. For instance, the device could be linked to a color sensor designed to detect the color of the device's surroundings and match, contrast, or otherwise select a color for the enclosure based on the surroundings. Alternatively, the device could be linked to a temperature, pressure, motion or other variable detection device so the device could function as an indicator of this variables current value.

Figure 4:
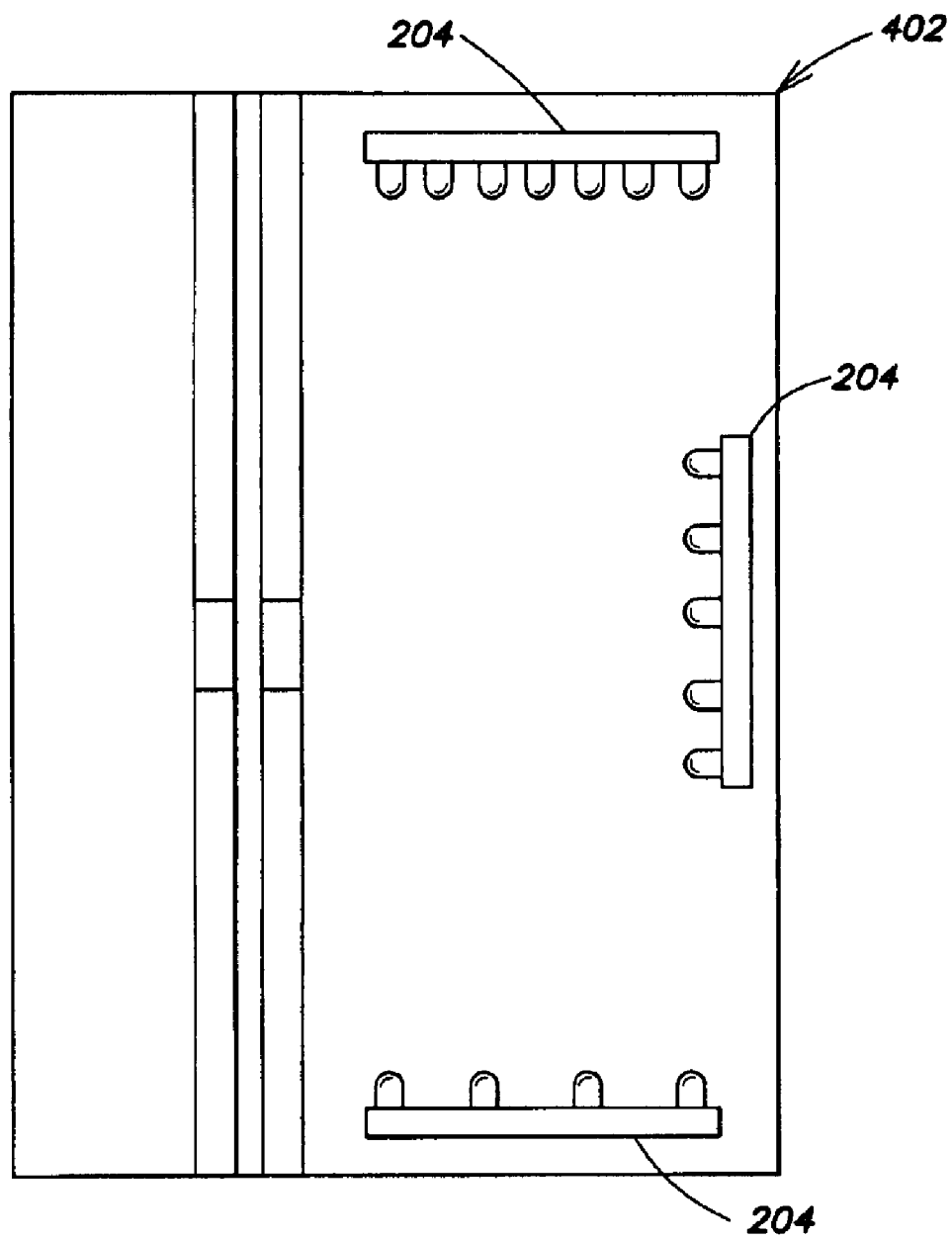
FIG. 4 illustrates a lighted refrigerator according to one embodiment of the invention.

Another embodiment of the invention as shown in FIG. 4 is directed to a refrigerator 402 where the front panel or a portion of the front panel is lit and changes colors with response to the temperature inside the unit by employing a system similar to that shown in FIG. 3. The refrigerator panel could also be receiving external signals of outside temperature or stock prices as in the computer example, or provide colors to a dieter to either encourage or discourage eating at a particular time.

Another embodiment would be the entire enclosure or a portion of an enclosure of an audio speaker or television where the color changing is linked to the audio or video signal where the signal may be preconditioned to provide certain lighting effects associated with the signal.

Although the changing of color has been described here, it is also included within the scope of this disclosure that in one embodiment the system could vary color on a specific scale (as opposed to generic red or green, a specific shade of red could be produced) or any other characteristics of the light could be altered such as, but not limited to, intensity, saturation, hue. The system could also be programmed with patterns or schemes for regularly changing colors and any of the characteristics of those patterns such as, but not limited to, speed or repetition could also be controlled. In another embodiment multiple pieces of information could also be provided on different portions of the enclosure as different colors so, for example a computer enclosure could indicate that the stock market is falling, and your broker has sent you e-mail. In still another embodiment, the illumination of the device could be sufficient to actually provide a light source for a room or other area.

In another embodiment the illumination device could provide a constant color not designed to be changed.

FIG. 1 illustrates a process 100 according to one embodiment of the present invention. In this embodiment, an input signal may be generated at act 102. A control signal may be generated at act 104 in response to the input signal. The control signal 104 may then be communicated (in act 108) to a lighting system which then illuminates an enclosure (act 110).

The input signal 102 may be generated by any number of sources. For example, the input signal 102 may be generated by a user interface such as a button, switch, keyboard, mouse, software interface, graphical user interface, or other user interface, a sensor or transducer, or another source such as a database, network, World Wide Web, or other signal generator (e.g. email alert signal, financial data from the web). The input signal 102 may comprise a combination of signal generators. For example, the lighting system may be responding to financial data and a user interface may be used to adjust the settings of the illumination.

In one embodiment, the input signal 102 may be converted into a lighting control signal. For example, the input signal 102 may be generated and or encoded with information corresponding to its source. Upon receipt of such a signal, a system according to one embodiment of the invention may generate corresponding lighting control signals. The generator may analyze the input signal and find that it originated from a financial database, for example. The generator may then select or generate control signals based on this information. The generator may be a processor that selects lighting control signals from an associated memory, generates a control signal based on an algorithm, modifies a control signal or program, selects a table or generates control signals through other methods. It should be appreciated that there are a number of ways to generate lighting control signals and the present invention should not be limited to any particular method.

In one embodiment, the control signals 104 may be communicated to a light system 108 arranged to illuminate an enclosure or portion thereof. In one embodiment, the light system may include at least one LED. In another embodiment, the light system may include two or more LEDs of different colors, wherein at least one of the LEDs is controlled through the control signal in such a way as to change the color of the emitted light from the light system. The light system may include three different colored LEDs (e.g. red, green, and blue) wherein the three colors are independently controlled through the control signals such that the emitting light from the light system can be changed.

As used herein, the term "LED" should be understood to include light emitting diodes of all types, light emitting polymers, semiconductor dies that produce light in response to current, organic LEDs, electro-luminescent strips, and other such systems. "LED" may refer to a single light emitting diode having multiple semiconductor dies that are individually controlled. It should also be understood that the term "LED" does not restrict the package type of the LED. The term "LED" includes packaged LEDs, non-packaged LEDs, surface mount LEDs, chip on board LEDs and LEDs of all other configurations. The term "LED" also includes LEDs packaged or associated with material (e.g. a phosphor) wherein the material may convert energy from the LED to a different wavelength.

While the invention has been disclosed in connection with the preferred embodiments shown and described in detail, various modifications and improvements thereon will become readily apparent to those skilled in the art. Accordingly, the spirit and scope of the present invention falls within the scope of the following claims and their equivalents.

What is claimed is:

1. A color-changing device, comprising:
   an enclosure formed at least in part by an at least partially transparent material;
   an illumination device disposed within the enclosure and configured to illuminate said material, the illumination device capable of generating at least two colors and including at least one LED-based light source, the illumination device adapted to output at least first radiation having a first wavelength and second radiation having a second wavelength; and
   a controller configured to control the at least one LED-based light source.

2. The color-changing device of claim 1, wherein said device includes at least one computer component, peripheral or accessory.

3. The color-changing device of claim 1, wherein said device includes one or more of the following: a disk drive, a mouse, a pointing device, a printer, a scanner, a keyboard, a cable, a modem, a media player, a DVD player, a DVD recorder, a CD player, a CD recorder, a tape player, a tape recorder, a stereo receiver, a self contained stereo system, a television, a television remote control, a television peripheral, a cable TV decoder box, a projection system, a speaker, a landline telephone, a wireless telephone, a radio frequency (RF) transmission device, an RF communication device, a personal digital assistants (PDA), a toy, a watch, an appliance, a refrigerator, a stove, an oven, a dishwasher, a trash compactor, and a hand-held device.

4. The color-changing device of claim 1, wherein said material is at least one of transparent, semi-transparent, translucent, and semi-translucent.

5. The color-changing device of claim 1, wherein said material includes means for reflecting light off of or out of the material.

6. The color-changing device of claim 1, wherein the controller is configured to control the LED-based light source in response to at least one signal provided by at least one user interface device.

7. The color-changing device of claim 1, wherein the controller is configured to control the LED-based light source in response to at least one audio signal or at least one video signal.

8. The color-changing device of claim 1, wherein said controller receives input from a network.

9. The color-changing device of claim 1, wherein said controller receives input from a user of the color-changing-device.

10. The color-changing device of claim 1, wherein the color-changing device includes a computer having the enclosure.

11. The color-changing device of claim 10, wherein the controller is configured to control the LED-based light source in response to information received by the computer.

12. The color-changing device of claim 11, wherein the controller is configured to control the LED-based light source so as to indicate representations of multiple pieces of information received by the computer on different portions of the enclosure.

13. The color-changing device of claim 11, wherein the information includes at least one email message, and wherein the controller is configured to control the LED-based light source based on the at least one email message.

14. The color-changing device of claim 11, wherein the information includes information received from the Internet, and wherein the controller is configured to control the LED-based light source based on the information received from the Internet.

15. The color-changing device of claim 14, wherein the information includes advertising information, and wherein the controller is configured to control the LED-based light source based on the advertising information.

16. The color-changing device of claim 14, wherein the information includes economic information, and wherein the controller is configured to control the LED-based light source based on the economic information.

17. The color-changing device of claim 1, wherein the controller is configured to control the LED-based light source in response to at least one signal provided by a sensing device.

18. The color-changing device of claim 17, in combination with the sensing device.

19. The color-changing device of claim 18, wherein the sensing device includes at least one of a color sensor, a temperature sensor, a pressure sensor, and a motion sensor.

20. The color-changing device of claim 19, wherein the controller is configured to vary a color of the enclosure in response to the at least one signal provided by the sensing device.

21. The color-changing device of claim 1, wherein the illumination device is configured to project patterns or symbols onto the enclosure.

22. The color-changing device of claim 20, wherein:
the color-changing device includes a refrigerator having a front panel;
the sensing device includes a temperature sensor; and
the controller is configured to vary a color of the front panel based on a temperature inside the refrigerator.

23. The color-changing device of claim 1, wherein the LED-based light source includes at least one red LED, at least one green LED, and at least one blue LED.

24. The color-changing device of claim 1, wherein the controller is configured to independently control at least a first intensity of the first radiation and a second intensity of the second radiation.

25. The color-changing device of claim 1, wherein the controller is configured to control the at least one LED-based light source so as to vary a color of at least a portion of the enclosure as perceived by an observer viewing the color-changing device from outside the enclosure.

26. The color-changing device of claim 1, wherein the controller is configured to control the at least one LED-based light source so as to project patterns or symbols onto the enclosure.

27. The color-changing device of claim 1, wherein the controller is configured to control the at least one LED-based light source so as to set a repetition rate of a single color projected onto the enclosure.

28. The color-changing device of claim 24, wherein the controller is further configured to independently control at least the first intensity of the first radiation and the second intensity of the second radiation so as to vary a color of the generated radiation as perceived by an observer viewing the color-changing device from outside the enclosure.

29. The color-changing device of claim 24, wherein the controller is further configured to independently control at least the first intensity of the first radiation and the second intensity of the second radiation so as to vary an overall brightness of the generated radiation as perceived by an observer viewing the color-changing device from outside the enclosure.

30. A method for changing the color of a device, the device having an enclosure, the method comprising acts of:
generating an input signal;
generating a control signal in response to the input signal;
controlling a lighting system via the control signal, the lighting system including at least one LED-based light source, the light source adapted to output at least first radiation having a first wavelength and second radiation having a second wavelength; and
arranging the lighting system to illuminate at least a portion of the device enclosure.

31. The method of claim 30, wherein the act of generating the input signal is accomplished through a user interface.

32. The method of claim 31, wherein the user interface is at least one of a switch, dial, button, key, and key board.

33. The method of claim 31, wherein the user interface is a graphical user interface.

34. The method of claim 30, wherein the act of generating the input signal is accomplished through at least one of a sensor and transducer.

35. The method of claim 30, wherein the act of generating the input signal is accomplished by receiving a signal.

36. The method of claim 35, wherein the signal is at least one of a network signal, database signal, and information signal.

37. An apparatus, comprising:
an enclosure having a surface;
at least one illumination device adapted to output at least first radiation having a first wavelength and second radiation having a second wavelength to provide variable color light, the at least one illumination device disposed proximate to the enclosure and configured to illuminate at least a portion of the surface of the enclosure with the variable color light, such that during operation of the at least one illumination device, at least the portion of the enclosure appears to have a variable color to an observer viewing the enclosure from outside the enclosure; and
a controller configured to control the at least one illumination device.

38. The apparatus of claim 37, wherein the apparatus includes a computer having the enclosure.

39. The apparatus of claim 38, wherein the controller is configured to control the at least one illumination device in response to information received by the computer.

40. The apparatus of claim 39, wherein the at least one illumination device includes at least one LED-based light source.

41. The apparatus of claim 39, wherein the controller is configured to control the at least one illumination device so as to indicate representations of multiple pieces of information received by the computer on different portions of the enclosure.

42. The apparatus of claim 39, wherein the information includes at least one email message, and wherein the controller is configured to control the at least one illumination device based on the at least one email message.

43. The apparatus of claim 39, wherein the information includes information received from the Internet, and wherein the controller is configured to control the at least one illumination device based on the information received from the Internet.

44. The apparatus of claim 43, wherein the information includes advertising information, and wherein the controller is configured to control the of least one illumination device based on the advertising information.

45. The apparatus of claim 43, wherein the information includes economic information, and wherein the controller is configured to control the at least one illumination device based on the economic information.

46. The apparatus of claim 37, wherein the controller is configured to control the at least one illumination device in response to at least one signal provided by at least one user interface device.

47. The apparatus of claim 37, wherein the controller is configured to control the at least one illumination device in response to at least one audio signal or at least one video signal.

48. The apparatus of claim 37, wherein the at least one illumination device is further configured to illuminate at least a portion of the surface of the enclosure with a single color at a given time.

49. The apparatus of claim 37, wherein the at least one illumination device is further configured to illuminate at least a portion of the surface of the enclosure by edge-lighting or back-lighting the enclosure.

50. The apparatus of claim 37, wherein at least part of the enclosure is transparent, translucent, semi-transparent, or semi-translucent.

51. The apparatus of claim 37, wherein the at least one illumination device is disposed within the enclosure.

52. The apparatus of claim 37, wherein the at least one illumination device is configured to project patterns or symbols onto the enclosure.

53. The apparatus of claim 37, wherein the at least one illumination device includes at least one of fiber optic strands, incandescent lighting, and fluorescent lighting.

54. The apparatus of claim 37, wherein the at least one illumination device includes at least one LED-based light source.

55. The apparatus of claim 54, wherein the at least one LED-based light source includes at least one red LED, at least one green LED, and at least one blue LED.

56. The apparatus of claim 37, wherein the controller is configured to control the at least one illumination device in response to at least one signal provided by a sensing device.

57. The apparatus of claim 37, wherein the controller is configured to control the at least one illumination device so as to vary a color of at least a portion of the enclosure as perceived by the observer.

58. The apparatus of claim 37, wherein the controller is configured to control the at least one illumination device so as to project patterns or symbols onto the enclosure.

59. The apparatus of claim 37, wherein the controller is configured to control the at least one illumination device so as to set a repetition rate of a single color projected onto the enclosure.

60. The apparatus of claim 56, in combination with the sensing device.

61. The apparatus of claim 37, wherein the controller is configured to independently control at least a first intensity of the first radiation and a second intensity of the second radiation.

62. The apparatus of claim 61, wherein the controller is further configured to independently control at least the first intensity of the first radiation and the second intensity of the second radiation so as to vary a color of the variable color light as perceived by the observer.

63. The apparatus of claim 61, wherein the controller is further configured to independently control at least the first intensity of the first radiation and the second intensity of the second radiation so as to vary an overall brightness of the variable color light as perceived by the observer.

64. The apparatus of claim 60, wherein the controller is configured to vary a color of the enclosure in response to the at least one signal provided by the sensing device.

65. The apparatus of claim 64, wherein:
the apparatus includes a refrigerator having a front panel;
the sensing device includes a temperature sensor; and
the controller is configured to vary a color of the front panel based on a temperature inside the refrigerator.

66. The apparatus of claim 60, wherein the sensing device includes at least one of a color sensor, a temperature sensor, a pressure sensor, and a motion sensor.

67. An appliance, comprising:
a surface;
at least one illumination device disposed within the appliance, the at least one illumination device adapted to output at least first radiation having a first wavelength and second radiation having a second wavelength to provide variable color light and configured to illuminate at least a portion of the surface of the appliance with the variable color light, such that during operation of the at least one illumination device, at least the portion of the appliance appears to have a variable color to an observer viewing the appliance; and
a controller configured to control the at least one illumination device.

68. The appliance of claim 67, wherein the at least one illumination device includes at least one LED-based light source.

69. An electronics device, comprising:
a surface;
at least one illumination device disposed within the electronics device, the at least one illumination device adapted to output at least first radiation having a first wavelength and second radiation having a second wavelength to provide variable color light and configured to illuminate at least a portion of the surface of the electronics device with the variable color light, such that during operation of the at least one illumination device, at least the portion of the electronics device appears to have a variable color to an observer viewing the electronics device; and
a controller configured to control the at least one illumination device.

70. The electronics device of claim 69, wherein the of least one illumination device includes at least one LED-based light source.

71. The electronics device of claim 69, wherein the electronics device is a computer.

72. An illumination method, comprising acts of:
a1) generating at least one of first radiation having a first wavelength and second radiation having a second wavelength to provide variable color light; and
a) illuminating at least a portion of a surface of an enclosure with the variable color light such that at least the portion of the enclosure appears to have a variable color to an observer viewing the enclosure from outside the enclosure.

73. The method of claim 72, wherein the act a1) includes an act of:

controlling the variable color light in response to at least one audio signal or at least one video signal.

74. The method of claim 72, wherein the enclosure encloses a computer, and wherein the act a1) includes an act of:
   a4) controlling the variable color light in response to information received by the computer.

75. The method of claim 74, wherein the act a4) includes an act of:
   indicating representations of multiple pieces of information received by the computer on different portions of the enclosure.

76. The method of claim 74, wherein the information includes at least one email message, and wherein the act a4) includes an act of:
   controlling the variable color light based on the at least one email message.

77. The method of claim 74, wherein the information includes information received from a network, and wherein the act a4) includes an act of:
   controlling the variable color light based on the information received from the network.

78. The method of claim 77, wherein the information includes advertising information, and wherein the act a4) includes an act of:
   controlling the variable color light based on the advertising information.

79. The method of claim 77, wherein the information includes economic information, and wherein the act a4) includes an act of:
   controlling the variable color light based on the economic information.

80. The method of claim 72, wherein the act a1) includes an act of:
   a3) controlling the variable color light in response to at least one signal provided by a sensing device.

81. The method of claim 80, wherein the act a3) includes an act of:
   varying a color of the enclosure in response to the at least one signal provided by the sensing device.

82. The method of claim 72, wherein the act a1) includes an act of:
   a2) independently controlling at least a first intensity of the first radiation and a second intensity of the second radiation.

83. The method of claim 82, wherein the act a2) includes an act of:
   independently controlling at least the first intensity of the first radiation and the second intensity of the second radiation so as to vary a color of the variable color light as perceived by the observer.

84. The method of claim 82, wherein the act a2) includes an act of:
   independently controlling at least the first intensity of the first radiation and the second intensity of the second radiation so as to vary an overall brightness of the variable color light as perceived by the observer.

85. The method of claim 72, wherein the act a) includes an act of:
   illuminating at least a portion of the surface of the enclosure with a single color at a given time.

86. The method of claim 72, wherein the act a) includes an act of:
   illuminating at least a portion of the surface of the enclosure by edge-lighting or back-lighting the enclosure.

87. The method of claim 72, wherein at least part of the enclosure is transparent, translucent, semi-transparent, or semi-translucent.

88. The method of claim 72, wherein the act a) includes an act of:
   illuminating from within the enclosure at least the portion of the surface of the enclosure with the variable color light.

89. The method of claim 72, wherein the act a) includes an act of:
   projecting patterns or symbols onto the enclosure.

90. The method of claim 72, further comprising an act of:
   controlling at least one of fiber optic strands, incandescent lighting, and fluorescent lighting to perform the act a1).

91. The method of claim 72, further comprising an act of:
   controlling at least one LED-based light source to perform the act a1).

92. The method of claim 91, wherein the at least one LED-based light source includes at least one red LED, at least one green LED, and at least one blue LED.

93. The method of claim 72, wherein the act a1) includes an act of:
   controlling a repetition rate of a single color of the variable color light.

94. The method of claim 72, wherein the act a1) includes an act of:
   controlling the variable color light in response to at least one signal provided by at least one user interface device.

95. A method for changing a color of a device having an enclosure formed at least in part by a partially transparent material, the method comprising acts of:
   providing an illumination device disposed in the enclosure, the illumination device capable of generating at least two colors and including at least one LED-based light source adapted to output illumination including at least first radiation having a first wavelength and second radiation having a second wavelength;
   illuminating at least a portion of said enclosure, via the illumination devise; and
   controlling the at least one LED-based light source so as to vary said illumination.

96. The method of claim 95, wherein the act of controlling the at least one LED-based light source includes controlling the at least one LED-based light source in response to an input signal received from a network, an external sensor, or a user interface.

* * * * *

UNITED STATES PATENT AND TRADEMARK OFFICE
CERTIFICATE OF CORRECTION

PATENT NO. : 6,888,322 B2
DATED : May 3, 2005
INVENTOR(S) : Dowling et al.

It is certified that error appears in the above-identified patent and that said Letters Patent is hereby corrected as shown below:

Title page,
Item [63], Related U.S. Application Data, please replace in its entirety to read:

--Continuation-in-part of application no. 09/669,121, filed September 25, 2000, entitled "Multicolored LED Lighting Method and Apparatus", now Pat. No. 6,806,659, which is a continuation of application no. 09/425,770, filed October 22, 1999, now Pat. No. 6,150,774, which is a continuation of application no. 08/920,156, filed August 26, 1997, now Pat. No. 6,016,038. Continuation-in-part of application no. 09/215,624, filed December 17, 1998, now Pat. No. 6,528,954, and a continuation-in-part of application no. 09/213,607, filed December 17, 1998, and a continuation-in-part of application no. 09/213,189, filed December 17, 1998, now Patent No. 6,459,919, and a continuation-in-part of application no. 09/213,581, filed December 17, 1998, and a continuation-in-part of application no. 09/213,540, filed December 17, 1998, and a continuation-in-part of application no. 09/333,739, filed June 15, 1999, and a continuation-in-part of application no. 09/815,418, filed March 22, 2001, now Pat. No. 6,577,080. Continuation-in-part of application no. 09/742,017, filed December 20, 2000, which is a continuation of application no. 09/213,548, filed December 17, 1998, now Pat. No. 6,166,496. Continuation-in-part of application no. 09/626,905, filed July 27, 2000, now Pat. No. 6,340,868, which is a continuation of U.S. Serial No. 09/213,659, filed December 17, 1998, now Patent No. 6,211,626.--

Signed and Sealed this

Thirteenth Day of September, 2005

JON W. DUDAS
*Director of the United States Patent and Trademark Office*